United States Patent [19]
Cardinal et al.

[11] 3,877,655
[45] Apr. 15, 1975

[54] SYSTEM, METHOD AND APPARATUS FOR PROCESSING RAW RUBBER INTO STRIP STOCK FOR RETREADING TIRES

[76] Inventors: Felix G. Cardinal, 10255 S.W. Lancaster Rd.; Ralph V. Cardinal, 3535 S.W. Buddington, both of Portland, Oreg. 97219

[22] Filed: Feb. 7, 1974

[21] Appl. No.: 440,508

Related U.S. Application Data

[62] Division of Ser. No. 244,514, April 17, 1972, abandoned.

[52] U.S. Cl. .......... 242/67.1 R; 242/81; 242/158 B; 242/DIG. 2
[51] Int. Cl. ............................................. B65h 17/02
[58] Field of Search ............ 242/55, 67.1 R, 158 B, 242/75.5, DIG. 2, 81

[56]        References Cited
        UNITED STATES PATENTS

| | | | |
|---|---|---|---|
| 2,135,072 | 11/1938 | Forster | 242/158 B X |
| 2,826,376 | 3/1958 | Wallin | 242/81 |
| 2,901,192 | 8/1959 | Nystrand | 242/75.5 |
| 3,598,337 | 8/1971 | Mackie | 242/67.1 R X |
| 3,690,583 | 9/1972 | Herman | 242/81 X |

FOREIGN PATENTS OR APPLICATIONS

| | | | |
|---|---|---|---|
| 647,565 | 10/1962 | Italy | 242/158 B |

*Primary Examiner*—John W. Huckert
*Assistant Examiner*—John M. Jillions
*Attorney, Agent, or Firm*—Klarquist, Sparkman, Campbell, Leigh, Hall & Whinston

[57] ABSTRACT

Heavy blocks, sheets or strips of raw rubber are converted by a conventional rubber mill to continuous strip material which is fed continuously, first through a cooling water bath, then through a second dry or liquid bath to reduce the stickiness of the strip stock as it proceeds toward and is wound onto a reusable spool. The spool is removably mounted on a cantilevered driven spindle of a rubber-winding machine having a torque-limiting drive feature so as not to wind the strip too tightly on the spool and a level wind mechanism for winding the strip stock evenly on the spool. When the spool is full, an ejection mechanism on the winding machine ejects the spool from the spindle. The heavy spool, having a 600- to 800-pound capacity, is lifted from ground level to a free-spooling position on a special wheeled hand cart equipped with a lever-actuated lift mechanism. The spool is wheeled on the cart to the infeed end of the extruding portion of a tire-retreading machine, and there the strip stock is free-spooled directly from the cart-mounted spool into the extruder for final sizing before being applied by the machine onto a tire being retreaded.

2 Claims, 8 Drawing Figures

SYSTEM, METHOD AND APPARATUS FOR PROCESSING RAW RUBBER INTO STRIP STOCK FOR RETREADING TIRES

This is a division of application Ser. No. 244,514 filed Apr. 17, 1972, now abandoned.

BACKGROUND OF THE INVENTION

1. Field of the Invention

The present invention relates to a method, system and apparatus for processing and handling rubber strip stock for use in retreading rubber tires.

2. Description of the Prior Art

According to conventional practice, blocks of raw rubber weighing approximately 90 pounds apiece or strips or sheets of raw rubber are fed into a rubber mill which converts the raw rubber to continuous strip stock. As it emerges from the mill, this strip stock is fed through a cooling bath and then directly and often by hand into cardboard boxes of approximately 200 pounds capacity apiece. These cardboard boxes are then transferred either to storage or directly to the extruding-retreading machines for use in retreading tires. In feeding the strip stock from these boxes into the extruder, the strip material frequently becomes tangled, tends to stick together and in general is difficult to handle, requiring the constant attention of a man at the infeed end of the extruder. After each cardboard box is emptied of its strip stock, the box is discarded and destroyed, usually by burning. However, these boxes are expensive, and often boxes costing a total of $10.00 to $100.00 are emptied and destroyed during a single day's operation in a retreading plant of average size. Also, since such boxes are not reusable, they create a considerable disposal problem, which is usually solved by burning at the plant, thereby either creating an air pollution problem or requiring expensive incineration equipment to meet air quality control standards.

SUMMARY OF THE INVENTION

In accordance with the present invention, the strip stock is treated with an antisticking compound as it emerges from a cooling bath and then wound on reusable spools having a 600-pound to 800-pound strip capacity, using a strip-winding machine equipped with a level wind mechanism, a torque-limiting feature, and a spool-ejection mechanism. A special hand cart equipped with a lever action spool-lifting and -mounting mechanism lifts a spool from ground level to an elevated free-spooling position on the cart. Spools of strip stock thus mounted are wheeled to the extruding machine where the strip stock is fed directly from the cart-mounted spool into the extruder. When the spool is emptied, it can be returned to the rubber-winding machine for reuse.

The new system, process and apparatus described eliminates the need for a man to manually feed strip stock produced by the rubber mill into small-capacity cardboard boxes for transfer to storage or to the retreading machine, eliminates the use of expensive boxes altogether, elminates altogether the box disposal problems of the prior art, simplifies the handling of the strip stock after it emerges from the rubber mill, and enables the handling of far larger quantities of strip stock at one time by a single man. The result is faster production, lower labor costs, lower material costs and therefore a lower overall cost of production.

Primary features of the invention include:

1. a new and improved method of processing and handling strip stock for use in retreading tires;

2. a new and improved system for processing and handling strip stock for use in retreading rubber tires incorporating an antisticking bath, large-capacity reusable spools for strip storage, a strip-winding machine for winding strip stock on the spools as it is produced by the mill, and special carts for lifting, mounting and transferring the heavy spools of strip stock, and for feeding the strip stock from the spools into the retreading machine;

3. a new machine for winding rubber strip stock on large reusable spools; and 4. a new cart for lifting, mounting for free-spooling and transporting large, heavy spools of rubber strip stock.

The foregoing and other objects, features and advantages of the present invention will become more apparent from the following detailed description, which proceeds with reference to the accompanying drawings.

DETAILED DESCRIPTION

General System and Method

Figure 1:
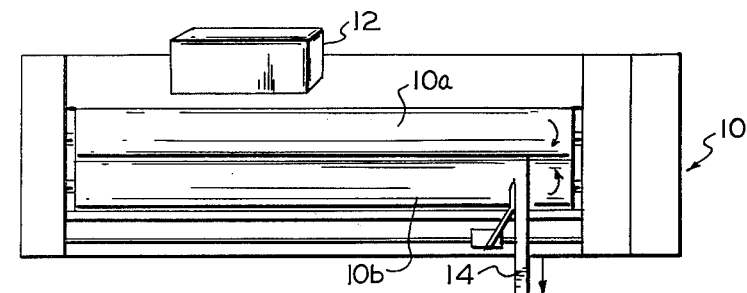
FIG. 1 is a schematic diagram of a system for processing raw rubber into strip stock and handling such stock for use in retreading rubber tires in accordance with the invention.

Referring to FIG. 1 of the drawings, a retreading operation in accordance with the invention includes a rubber mill 10 which is conventional and which includes a pair of oppositely rotating, large metal drums 10a, 10b between which raw rubber stock, indicated at 12 and typically in blocks weighing about 90 pounds apiece, is fed. The drums work the raw rubber to raise its temperature and spread it over the drums into a sheet of desired thickness. When the rubber is worked to the desired extent, a fixed slitter knife at one side of one drum slits the sheet along one edge, and the slit portion is pulled from the drum in a continuous strip as indicated generally at 14. This strip may be of varying dimension depending on need, but typically might be, for example, 3 inches wide by one-half inch thick, stripped at a rate of 50 to 90 feet per minute. A well-known rubber mill for this purpose is one manufactured by Kobe Machinery of Japan.

From the rubber mill the strip 14 proceeds downstream through a conventional water cooling bath 16, which includes a large tank of water 16a in which a large generally cylindrical "squirrel cage" 16b is partially submerged and rotates to carry the strip material in a series of turns through the cooling bath.

From the cooling bath the strip 14 proceeds through a second bath 18 which reduces the stickiness of the rubber. This step of the process is not conventional. The antisticking material is contained in an open, elongate tank 18a, and guide rollers guide the strip stock down through the material in the tank and then up through rollers which remove excess material from the strip. An antisticking compound suitable for this purpose is zinc stearate, used in either dry powder form or in solution.

From the antisticking bath the strip 14 is wound on a reusable spool 20 rotated on a spindle 22 of a strip-winding machine 24. This machine is designed especially for winding rubber strip stock on the large-capacity spool 20, which typically has a capacity of from 600 to 800 pounds of rubber strip stock. The machine includes an electric motor spindle drive with a built-in torque-limiting feature to prevent winding the strip too tightly on the spool. The machine also has a level wind mechanism for winding the strip stock evenly on the spool and an ejection mechanism for removing full spools from the spindle.

The wound spools 20 are lifted and mounted for free-spooling on special hand carts 26 which are used to transfer the spools to storage and to a position at the infeed end of a combination extruder and tire-retreading machine, indicated generally at 28. A typical such machine is manufactured by AMF Company under the trade name "Orbitread." Such a machine takes the roughly dimensioned strip stock 14 from one of the spools 20 mounted for free-spooling on a cart 26 and sizes the strip to a final dimension suitable for application to a tire of a specified size. The finally sized strip 14a emerges from the extruder portion 28a of the machine and from there is applied automatically directly to the carcass 30 of a worn tire which is rotatably mounted and driven by the retreading portion of the machine indicated at 28b. The extruder-retreader is automatic in operation and is pre-programmed according to the size of the tire to apply the finally dimensioned strip 14a on the carcass to the correct width and thickness.

The described system and method of processing and handling the strip stock differs from prior known systems in the use of the non-sticking bath followed by the direct winding of the thus-treated strip stock onto large-capacity reusable spools on the rubber-winding machine. Such method and system, unlike the prior art, also includes lifting, mounting for free-spooling and transferring full spools to the extruder-retreading machine on special hand carts for this purpose and there feeding the strip stock directly from the cart-mounted spools into the extruder. The system thus eliminates the use of the small-capacity but expensive disposable cardboard boxes that were formerly used to store the strip stock. Elimination of such boxes also eliminates the man that was once required to load such boxes and the problem of disposing of such boxes after a single use.

Winding Spool

Figure 4:
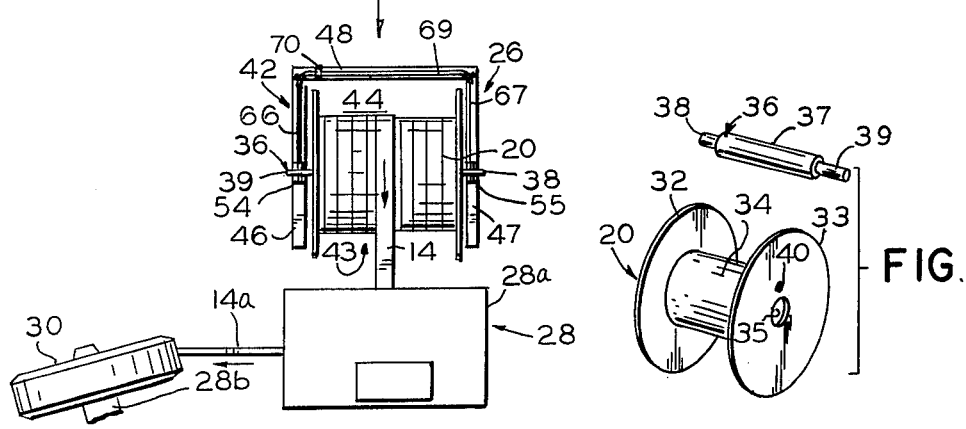
FIG. 4 is a perspective view of a spool used with the system of the invention.

Referring to FIG. 4, the reusable spools 20 on which the strip rubber is wound may be made inexpensively of wood or of any other strong lightweight material. These spools are of large capacity, at least several times the weight of the individual rubber blocks 12 from which the strip is formed and preferably in the range of from 600 to 800 pounds of strip rubber. Each spool includes a pair of oppositely disposed large circular rims 32, 33 interconnected by a central arbor 34 on which the strip is wound. The arbor is of hollow construction, and the rims include axial openings 35 leading into the interior of the arbor. These openings are sized so that the spool can be slipped easily onto the spindle 22 of the winding machine. At least one of the rims 32, 33 is provided with a smaller hole 40 offset from the large hole 35 for receiving a drive pin on the winding machine spindle 22.

The spool is also provided with a removable mandrel 36. The cylindrical mandrel includes a main body portion 37 of approximately the same diameter as spindle 22 so as to slip readily through the openings 35 of the spool rims. The mandrel also has opposite end portions 38, 39 of reduced diameter which project from the opposite ends of the spool rims when the mandrel is inserted into the spool. These end portions adapt the spool for mounting on the cart 26. The mandrel is inserted into the spool after the spool is removed from the winding machine so that it can be picked up by the cart.

Spool-Handling Cart

Figure 2:
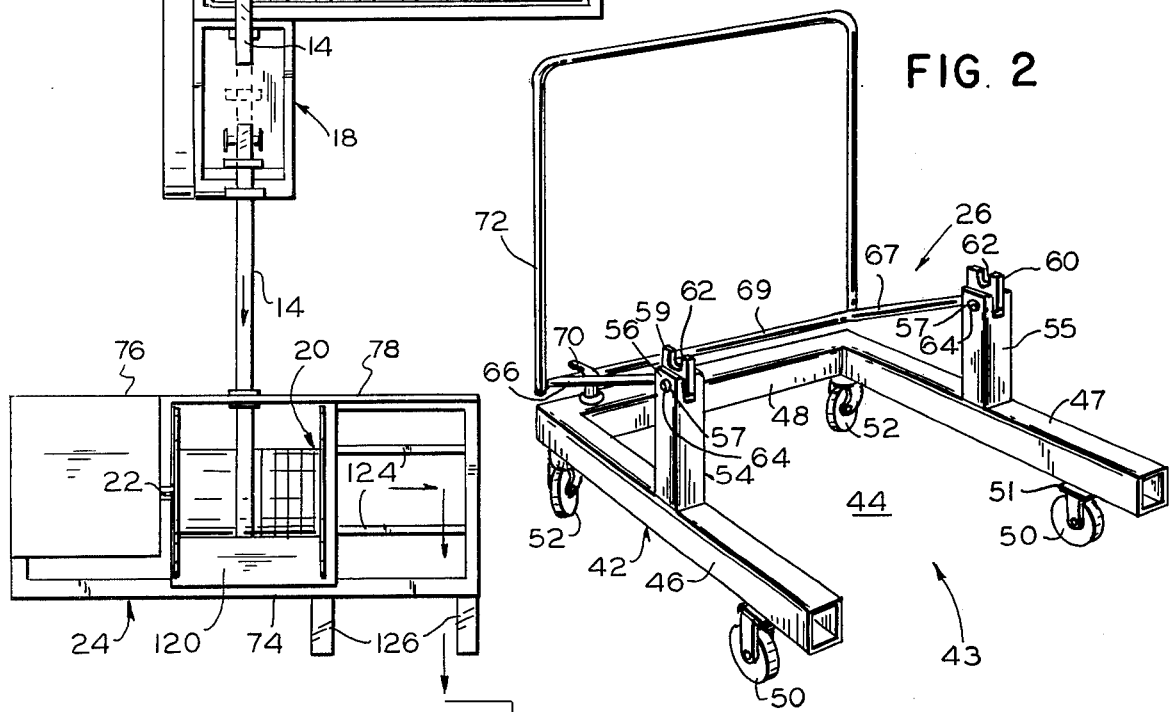
FIG. 2 is a perspective view of a hand cart in accordance with the invention as viewed from in front, and above such cart.
Figure 3:
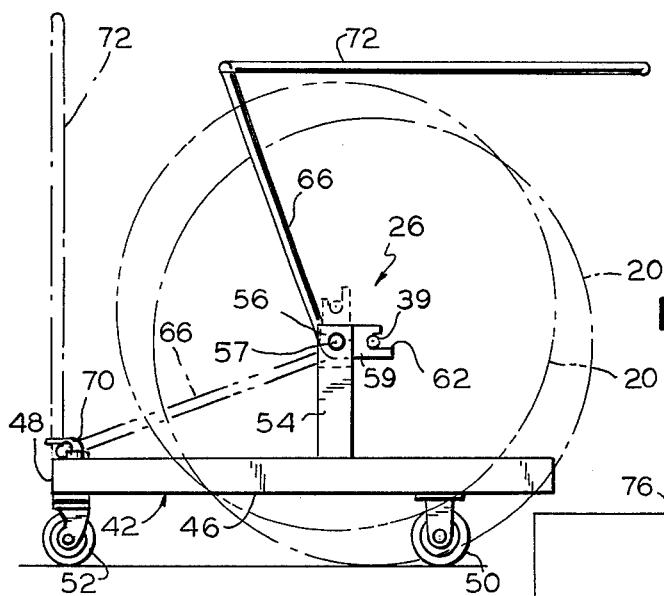
FIG. 3 is a side elevation of the cart of FIG. 2 illustrating the spool-lifting mechanism thereof in two positions of operation.

Referring to FIGS. 2 and 3, the special cart 26 for handling spools 20 includes a generally U-shaped base frame 42 defining a front end opening 43 leading into an interior space 44. This space is sized so as to receive a spool at ground level supported horizontally on its rims when positioned transversely of the cart. Frame 42 includes a pair of opposite side frame members 46, 47 joined at their rear ends by a rear cross frame member 48. The forward ends of the side frame members are supported on forwardly directed wheels 50 which are fixed against swiveling movement by fixed wheel-mounting brackets 51. However, rear wheels 52 are caster-mounted for swiveling movement at the rear ends of the side frame members.

A pair of upright support posts 54, 55 extend upwardly from intermediate portions of the side frame members 46, 47, respectively. The upper ends of such posts define clevises 56 which receive pivot pins 57 for pivotally mounting a pair of spool lift means 59, 60. As best shown in FIG. 3 with respect to lift means 59, each such lift means comprises a forked member including a forward fork opening 62 sized for rotatably receiving the reduced cylindrical portions 38, 39 of spool mandrel 36. Each fork member includes a pivot opening 64 rearwardly of fork opening 62 for receiving the clevis pin 57 of one of the frame support posts 54, 55.

The pivot connections of the forked members to the frame support posts 54, 55 are at a level such that when the forked members are positioned with their fork openings directed forwardly in a first position as shown in solid lines in FIG. 3, the ends of mandrel 36 within a spool 20 lying horizontally at ground level can enter the fork openings. Thus when the fork members are pivoted to a second, upwardly directed position as shown in hidden lines in FIG. 3, they effectively lift the spool on its mandrel to an elevated position for free-spooling rotation within the fork openings 62.

Lever-action means are also provided for manually pivoting the fork members from their first forwardly directed positions to their second upwardly directed positions. Such means includes a pair of parallel lever arms 66, 67 extending generally rearwardly along the side frame members from rigid connections with rear portions of the two fork members. The lever arms are connected at their rear ends by a cross bar 69 for effecting simultaneous pivoting movement of the fork members. When the fork members are in their forwardly directed positions, the lever arms extend upwardly and slightly rearwardly, as shown in full lines in FIG. 3. When the fork arms are pivoted to their upwardly directed positions, the lever arms extend downwardly and rearwardly, with the cross bar 69 extending along the rear cross frame member 48 of the cart frame. A latching member 70 on cross frame member 48 selectively locks the cross bar 69 to the frame and thus the fork arms in their upwardly directed spool-mounting positions.

For the convenience of the operator in pushing the cart with a spool mounted thereon, a U-shaped handle 72 is connected to the opposite ends of the cross bar 69 of the lift-actuating means in a manner such that the handle extends upwardly from a rear portion of the cart, as shown in FIG. 2, when the fork members 59, 60 are in their upwardly directed positions.

Alternatively, the push handle could be connected rigidly to the rear portion of the frame, separate from the lever fork-actuating mechanism so that the handle remains in a pushing position regardless of the position of the fork members.

Strip-Winding Machine

Figure 5:
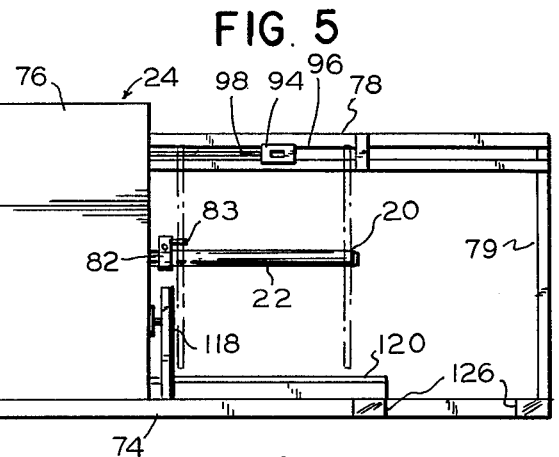
FIG. 5 is a front elevation of a strip-winding machine in accordance with the invention.
Figure 6:
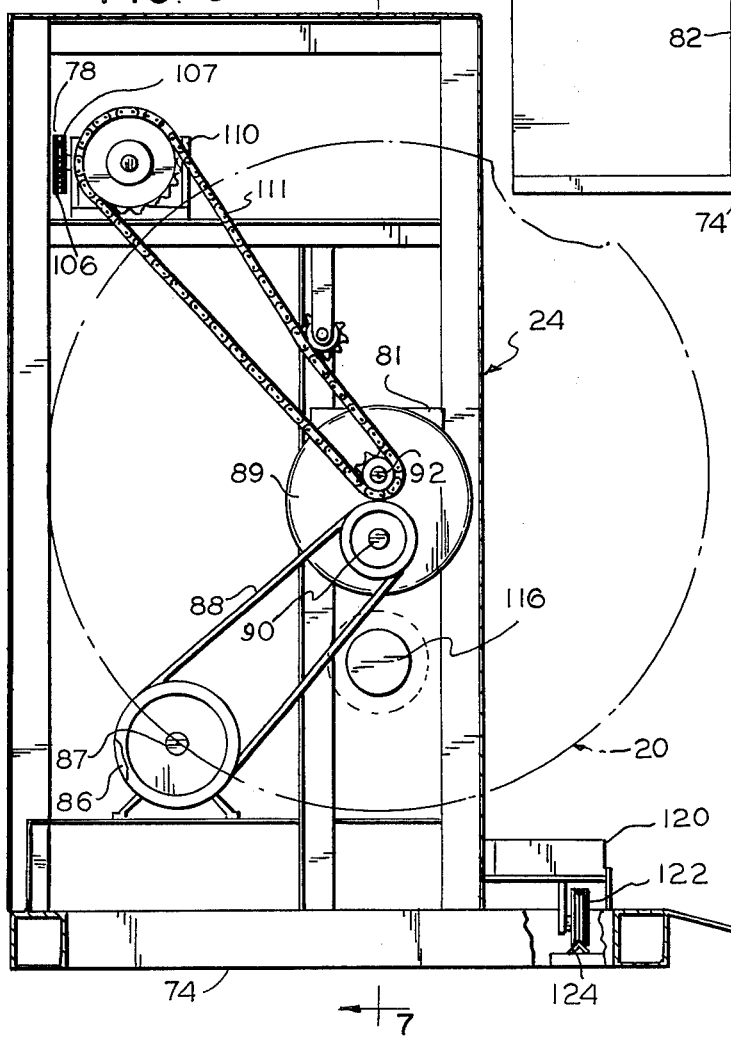
FIG. 6 is a vertical sectional view taken approximately along the line 6—6 of FIG. 5 on an enlarged scale.
Figure 8:
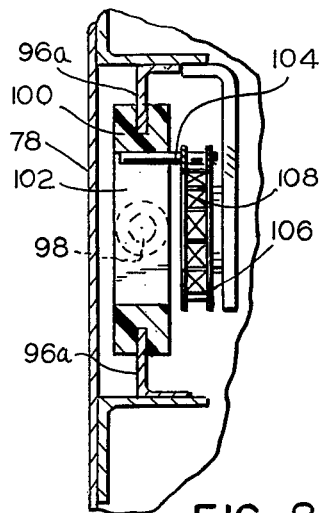
FIG. 8 is a vertical sectional view taken along the line 8—8 of FIG. 7.
Figure 7:
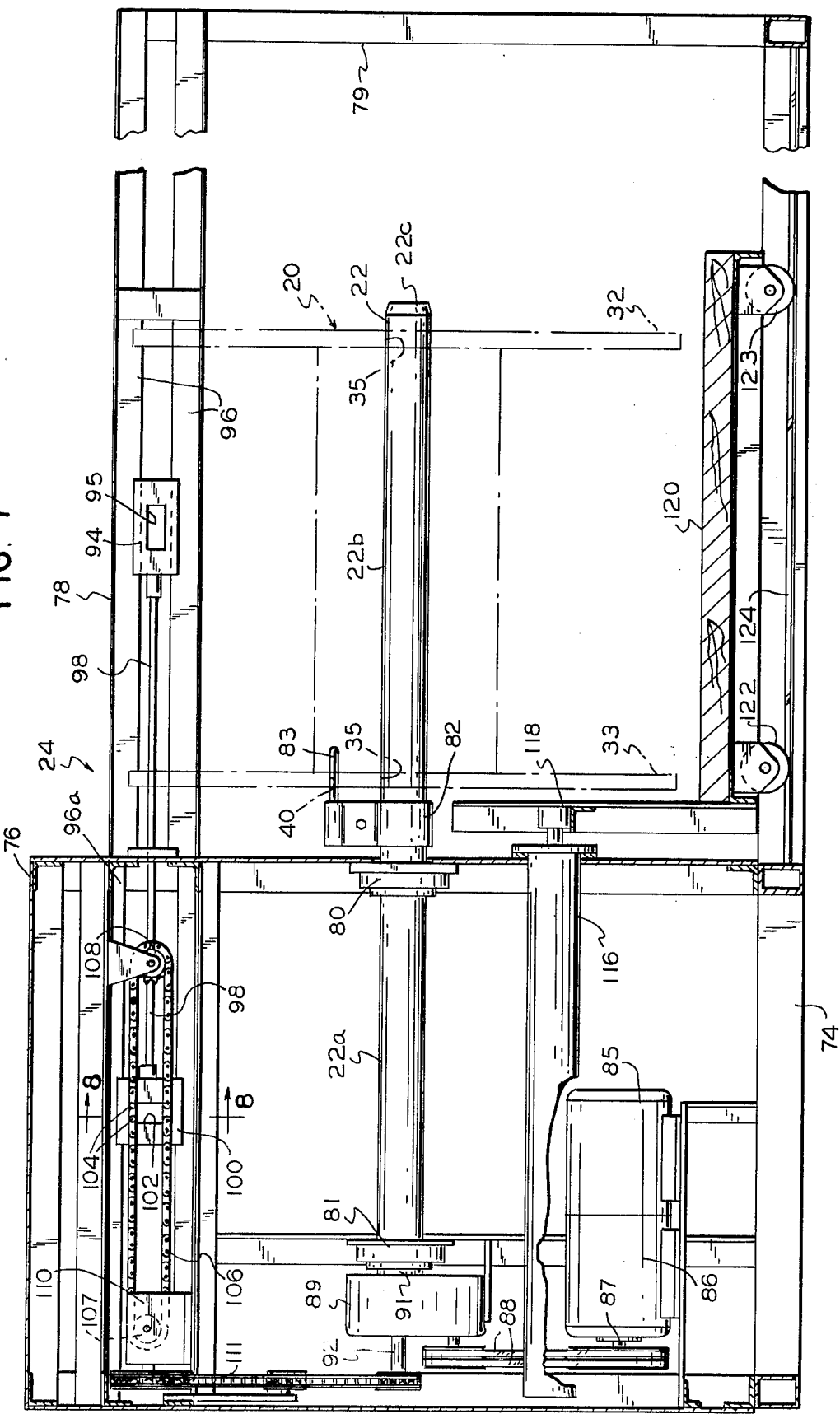
FIG. 7 is a vertical sectional view taken approximately along the line 7—7 of FIG. 6.

Referring to FIGS. 5, 6 and 7, the strip-winding machine 24 includes a base frame 74 having a drive housing 76 extending upwardly from one end thereof. The spool-mounting spindle 22 extends horizontally from an intermediate portion of the housing along and above the frame. A level wind means 78 extends within and from an upper rear portion of the housing generally parallel to the spindle but offset laterally therefrom in a direction toward the rubber mill. The level wind is supported at one end of the base frame by an upright frame support 79.

Spindle 22 includes a spindle shaft portion 22a within drive housing 76 and rotatably supported in suitable bearings 80, 81 near opposite ends of the housing. A spool-mounting portion 22b of the spindle forms a cantilevered outward extension of the spindle shaft portion 22a outside of the housing, terminating at a free end 22c at which spools 20 are introduced onto and discharged from the spindle. The spool-mounting portion 22b of the spindle has a collar 82 mounting a drive pin 83 which engages the drive pin opening 40 in the spool rim 33 so that the spool is rotated when the spindle shaft is driven.

The spindle is driven by an electric motor 85 incorporating a torque-limiting portion 86. The drive from the motor is through an output shaft 87 from the torque-limiting unit and a belt and pulley drive 88 transmitting power to a gear box 89. The gear box has a single input 90 and two outputs, one at 91 driving the spindle and one at 92 for driving the level wind mechanism.

In a prototype of the winding machine, the electric drive motor and torque control unit was a Model M-3½ horsepower Adjusto-Speed brand electric motor with eddy current drive, manufactured by Eaton, Yale & Towne. The motor was wired to run at a constant 1,700 rpm, with the eddy current drive feature being adjusted to disengage the output 87 at a predetermined torque value beyond which the rubber strip material would be wound too tightly on the spool. Such a motor in effect provides an electrical clutch or friction drive. Of course, any equivalent electrical, mechanical or other torque-limiting control could be provided in the power train between the prime mover and the spindle as desired.

The level wind means 78 includes a first slide member 94 having a horizontal slot 95 through which the rubber strip material passes from the rubber mill onto the spool. Slide member 94 is mounted for sliding movement along a guideway 96 which extends above and along the spool-mounting portion of the spindle and also includes an extension 96a within drive housing 76. Slide member 94 reciprocates along slide member 96 in a region between the opposite end rims of the spool to wind the rubber strip material evenly on the spool arbor.

Slide member 94 reciprocates along the guideway under the influence of a driven reciprocating connecting rod 98 powered from within the drive housing. The inner portion of connecting rod 98 within the housing is connected to a second slide member 100 having a vertical slot 102. Slide member 100 is preferably made of a plastic or other material, such as nylon, having a low coefficient of friction and slides along the inner extension 96a of guideway 96. A pair of long drive pins 104 extending laterally from links of an endless drive chain 106 to project into the vertical slot 102 of slide member 100 to drive the slide member as the chain itself is driven. The drive chain is trained about a pair of spaced sprockets 107, 108, with the overall length of the drive chain defining the reciprocatory stroke of the slide member 100 and thus also the slide member 94. Sprocket 107 driven by power transmitted through a right angle gear box 110 which in turn receives power through a drive chain 111 from the output 92 of the previously mentioned gear box 89.

As drive chain 106 is driven in a clockwise direction in FIG. 7, drive pins 104 at the top of the vertical slot 102 push slide member 100 toward the right until such slide member reaches a position alongside sprocket 108. Movement of slide member 100 toward the right stops as drive pins 104 travel about sprocket 108 and simultaneously ride down to the bottom of vertical slot 102. Such pins then begin driving the slide member in the opposite direction, toward the left in FIG. 7, as they reach the lower run of the chain. Such movement continues until slide member 100 reaches a position alongside sprocket 107. There, the motion of slide member 100 is again reversed. In this manner the rotary unidirectional motion of the drive chain is translated into reciprocatory motion in slide member 100, which in turn transmits its reciprocatory motion through connecting rod 98 to slide member 94, giving the latter its level winding action.

The winding machine also includes an ejector means comprising a fluid-actuated extensible power cylinder 116 mounted horizontally within drive housing 76. The cylinder has a ram portion 118 extending through and positioned outside the housing below spool-mounting portion 22b of the spindle. When cylinder 116 is in its retracted position, ram 118 lies next to an inner end of a spool mounted on the spindle. However, the cylinder 116 has a sufficient stroke so that when extended, ram 118 extends at least to the free end 22c of the spindle so as to push a spool from the spindle.

Ram 118 is also connected to an inner end of a wheeled platform 120 having sets of wheels 122, 123 mounted on parallel rails 124 within the opposite sides of base frame 74. Rails 124 extend parallel to and below the spool-mounting portion 22b of spindle 22 and also extend well beyond the free end of such spindle. The upper surface of platform 120 is at a level such that the rims of a spool mounted on the spindle are spaced slightly above such surface. This permits free rotation of the spool with the spindle despite the wheeled platform 120 being positioned directly below the spool when cylinder 116 is retracted.

When cylinder 116 extends, ram 118 pushes the spool from the spindle, and at the same time the ram rolls the platform on its rails beyond the free end of the spindle to receive the spool as it drops from the spindle. This prevents damage both to the heavy wound spool and to the winding machine itself when the spool drops. Thereafter the spool can be rolled from wheeled platform 120 down ramps 126 leading from the base frame to the floor of the building housing the system. Once on the floor, the spool can be picked up and transported readily to storage or to the extruder by cart 26.

Having illustrated and described a preferred embodiment of our invention, modifications in arrangement and detail will readily occur to persons skilled in the art. We claim as our invention all such modifications as come within the true spirit and scope of the following claims.

We claim:

1. In a system for processing raw rubber into strip stock for use in retreading rubber tires, including a rubber mill and an extruder-retreading machine, a strip-winding machine for winding rubber strip stock onto a spool for delivery to said extruder-retreading machine as the strip stock emerges in a continuous strip from said rubber mill, said strip-winding machine comprising:

a horizontally disposed rotatable spindle means for removably mounting a spool thereon, including spool-engaging means on said spindle means for drivingly engaging said spool, spindle drive means for rotating said spindle means and thus said spool, said spindle drive means including torque-limiting means for limiting the torque transmitted to said spindle means and thereby controlling the tension in strip stock being wound on said spool, level wind means driven from said spindle drive means for winding strip stock evenly on a spindle-mounted spool, and spool ejector means for selectively ejecting a spool from said spindle means, said spindle means including a spool-mounting portion and a spindle shaft portion, said spindle shaft portion being of approximately the same length as said spool-mounting portion, said spindle shaft portion being rotatably supported by bearing means adjacent its opposite ends, said spool-mounting portion being cantilevered from and forming an axial extension of said spindle shaft portion and terminating at an unsupported free end, said spool ejector means including rail means extending parallel to and below said spool-mounting portion of said spindle means, said rail means extending along the length of said spool-mounting portion and longitudinally outwardly beyond said free end of said spool-mounting portion, wheeled platform means mounted for movement along said rail means toward and away from said free end with a spool-supporting surface just slightly below the lowermost limits of a spool when mounted on said spool-mounting portion, extensible pusher means including a vertically extending pusher plate connected to said platform means and fluid-operated cylinder means having an extensible ram portion connected to said pusher plate and an axis of extension lying generally parallel to the axis of rotation of said spindle means, said extensible ram portion having a stroke at least as great as the length of said spool-mounting portion and being movable from a retracted position wherein said pusher plate is positioned rearwardly of a spool mounted on said spool-mounting portion and said platform means is positioned below said spool-mounting portion to an extended position to engage said pusher plate with said spool and push said spool from said spool-mounting portion and simultaneously move said platform means to a position outwardly of said spool-mounting portion to receive said spool as it drops from said spool-mounting portion.

2. A machine according to claim 1 wherein said level wind means includes a guideway means extending above and parallel to said spindle means, a first horizontally slotted slide member movable along said guideway above said spool-mounting portion of said spindle means for guiding strip material onto a spool on said spindle means, endless drive means including an endless drive member displaced horizontally and axially from said first slide member and extending generally parallel to said spindle means with the length of said endless drive member defining the stroke of reciprocation of said first slide member, a second slide member slidable along said guideway means in the region of said endless drive member but offset laterally therefrom, said second slide member being vertically slotted with the vertical length of said slot being at least as great as the vertical extent of said endless drive member, said endless drive member including drive pin means extending laterally into the vertical slot of said second slide member whereby unidirectional rotational movement of said endless drive members effects horizontal reciprocation of said second slide member, and connecting rod means operatively interconnecting said first and second slide members whereby reciprocation of said second slide member causes a corresponding reciprocation of said first slide member.

* * * * *